(12) United States Patent
Hattori

(10) Patent No.: US 6,240,957 B1
(45) Date of Patent: Jun. 5, 2001

(54) BACKWARD FLOW PREVENTION VALVE

(75) Inventor: Toshio Hattori, Sagamihara (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/514,192

(22) Filed: Feb. 28, 2000

(30) Foreign Application Priority Data

Mar. 3, 1999 (JP) .................................................. 11-056158

(51) Int. Cl.$^7$ .................................................. F16K 15/03
(52) U.S. Cl. ........................ 137/527.6; 137/515; 137/592
(58) Field of Search .................................. 137/515, 527, 137/527.4, 527.6, 592

(56) References Cited

U.S. PATENT DOCUMENTS

| 198,501 | * | 12/1877 | Volkman | 137/527.6 |
| 2,630,783 | * | 3/1953 | Reeve | 137/527.6 |
| 5,044,396 | * | 9/1991 | Daudet et al. | 137/527.6 |
| 5,713,389 | * | 2/1998 | Wilson, Jr. et al. | 137/527 |
| 6,019,127 | * | 2/2000 | Orita et al. | 137/592 |

* cited by examiner

Primary Examiner—Michael Buiz
Assistant Examiner—Ramesh Krishnamurthy
(74) Attorney, Agent, or Firm—Kanesaka & Takeuchi

(57) ABSTRACT

A back flow preventing valve is formed of a valve main body and a valve member. The valve main body includes a fluid inlet at one side, a fluid outlet at the other side having a valve seat at an end surface thereof, a flange extending outwardly from an outer periphery thereof and located between the fluid inlet and outlet, and a bent portion situated inside the valve main body near the fluid outlet for changing a flowing direction of a fluid flowing through the valve main body. The area of the fluid outlet is greater than that of the fluid inlet. The valve member is pivotally connected to the valve main body and urged toward the valve seat. The valve member is opened when a fluid entering from the fluid inlet is ejected from the fluid outlet, and closed when the fluid does not flow from the fluid inlet to the fluid outlet. When the valve is installed in a tank, the valve main body is entered from a side of the fluid outlet into a hole of a valve attaching portion of a tank and the flange is fixed to the valve attaching portion.

7 Claims, 11 Drawing Sheets

BACKWARD FLOW PREVENTION VALVE

BACKGROUND OF THE INVENTION AND RELATED ART STATEMENT

The present invention relates to a valve having a backward flow prevention function disposed in a tank. Especially, the present invention relates a valve which changes a flow direction of a guided fluid at an outlet side while a decrease of supply ability of the fluid in accordance with the change of the flow direction is prevented. Also, the present invention relates to a valve made of plastic integrally welded with a tank, wherein a valve seat can be securely closed by a valve member.

In a port for supplying a fuel in a fuel tank of an automobile, a valve having backward flow prevention means is provided so that gasoline does not flow backwardly at the time of filling a fuel.

In case a fuel tank 120 provided with a valve 100 is made of plastics, as shown in FIG. 16, the valve 100 is made of plastics and has a cylindrical shape provided with an annular outer peripheral flange 103 in a middle portion thereof, and front and rear portions of the outer peripheral flange 103 are formed as an insertion cylinder portion 101 and an attachment cylinder portion 102 for a filler hose 130. Then, a distal end opening of the insertion cylinder portion 101 is oriented in a direction perpendicular to a center line of the insertion cylinder portion 101, and an open end surface of the opening is constituted as a valve seat, to which a plate-like valve member 105 is urged against the valve seat in a vertically downward direction. The insertion cylinder portion 101 is inserted in a horizontal direction into an attachment hole 121 formed in the fuel tank 120, and the outer peripheral flange 103 is disposed to abut against and welded to a portion of a surrounding wall 122 of the attachment hole 121 in the fuel tank 120.

In the valve 100 structured as describe above, the valve 100 is attached to the fuel tank 120 by inserting and welding the insertion cylinder portion 101 of the valve 100 into the attachment hole 121 in the fuel tank 120. Thus, there is an advantage that even if an internal pressure of the fuel tank 120 becomes high, a back flow of the fuel from the fuel tank 120 is prevented. On the contrary, there is a disadvantage that a direction of a flow of a fluid, such as gasoline, guided by the valve 100 from the filler hose 130 toward the fuel tank 120 is not changed at an outlet side of the valve 100, and the fluid flows into the fuel tank 120 as it is.

In view of the above, as shown in FIG. 17, there has been prepared a cylindrical valve 100 made of plastics and provided with an outer peripheral flange 103 in an annular shape at a middle portion thereof, and front and rear of the outer peripheral flange 103 are formed as an insertion cylinder portion 101 and an attachment cylinder portion 102. Further, an upper portion of the distal end opening portion of the insertion cylinder portion 101 is closed by a closing plate portion 104, and an open end surface of an opening in a semi-circular arch shape, which orients in a direction perpendicularly to a center line of the cylinder portion and is formed between a lower end rim of the closing plate portion 104 and the distal end opening portion, is formed as a valve seat. And, a plate-like valve member 105 is provided to be urged against the valve seat in a vertically downward direction. The valve 100 is structured such that in a condition that the insertion cylinder portion 101 is inserted into an attachment hole 121 formed in the fuel tank 120, the outer peripheral flange 103 abuts against and is welded to a surrounding wall 122 of the attachment hole 121 in the fuel tank 120.

However, in the valve 100 structured as described above, even though there is an advantage that a direction of a fluid, such as supply fuel, is changed at the distal end side of the valve 100 attached to the fuel tank 120 so that the fuel can be supplied to the fuel tank 120, there is a disadvantage that an area of the opening at the outlet side of the valve 100 is extremely smaller than an area of the opening at the inlet side of the valve 100, so that an ability of smoothly supplying fuel can not be obtained.

The present invention has been made to solve the above disadvantages in the conventional valve, and a main object of the present invention is to provide a valve in which a direction of the a supply fluid is changed at a distal end side of the valve while preventing a decrease of fluid supply characteristic in accordance with the change of the flow direction of the fluid.

Another object of the invention is to provide a valve as stated above, wherein a decrease of fluid cutoff characteristic induced by the means for preventing the decrease of fluid supplying characteristic can be effectively prevented.

Further objects and advantages of the invention will be apparent from the following description of the invention.

SUMMARY OF THE INVENTION

In order to attain the above objects, a first aspect of the invention is directed to a valve in a cylindrical shape formed of a valve main body, and a valve member. The valve main body has a valve seat at an outer end surface of an outlet, to which the valve member is attached such that the valve member opens by a fluid flowing from an inlet side to an outlet side while preventing a backward flow from the outlet side to the inlet side.

The valve main body can be inserted from the outlet side of the valve into a hole of a valve attaching portion of a tank. A flange of the valve main body abuts against and is welded to the valve attaching portion.

At a distal end of the outlet side of the valve main portion, there is provided a wall portion for changing a flowing direction of a fluid guided by the valve main body. The outlet opening is opened to cross obliquely to the fluid flow guided by the cylindrical wall such that the area of the outlet opening is greater in size than that at the inlet side.

In the valve as structured above, the valve with the valve member for preventing a back flow of the fluid at the outlet side can be inserted from the outlet side into the attachment hole of the tank and is integrally welded thereto. In the valve, the flow direction of the fluid guided by the valve can be changed at the outlet side without decreasing the supply amount of the fluid.

In the second aspect of the invention, the valve main body has a cylindrical shape with an outer flange, and is formed of a first cylindrical member having an attachment portion for a hose and a connection portion, and a second cylindrical member connected to the connection portion and having the valve member at the distal end. The second cylindrical member and the valve member are made of a plastic material harder in swelling the fluid than a plastic material for the first cylindrical member.

In the valve as structured above, the valve can be inserted from the outlet side thereof into the attachment hole of the tank and is integrally welded thereto. The flow direction of the fluid guided by the valve can be changed at the outlet side without decreasing the supply amount of the fluid. Also, the valve member attached to the outlet side of the valve is disposed to have a good opening and closing condition in the fluid path.

DETAILED DESCRIPTION OF PREFERRED EMBODIMENTS

Hereunder, a valve B according to a typical embodiment of the present invention will be explained in detail.

Figure 1:
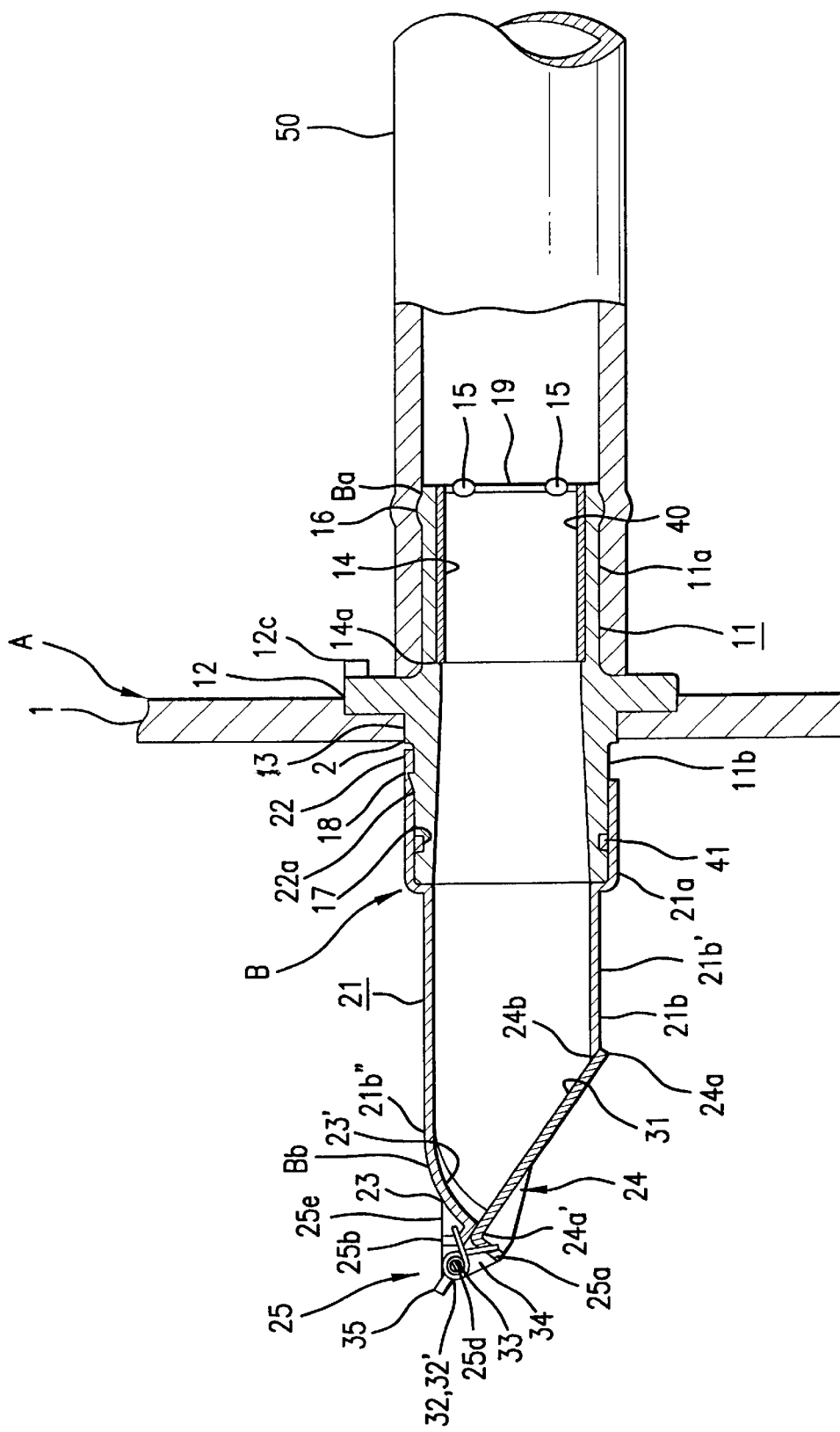
FIG. 1 is a partly sectional schematic view showing an attachment condition of a valve according to an embodiment of the present invention when a valve member is closed.
Figure 2:
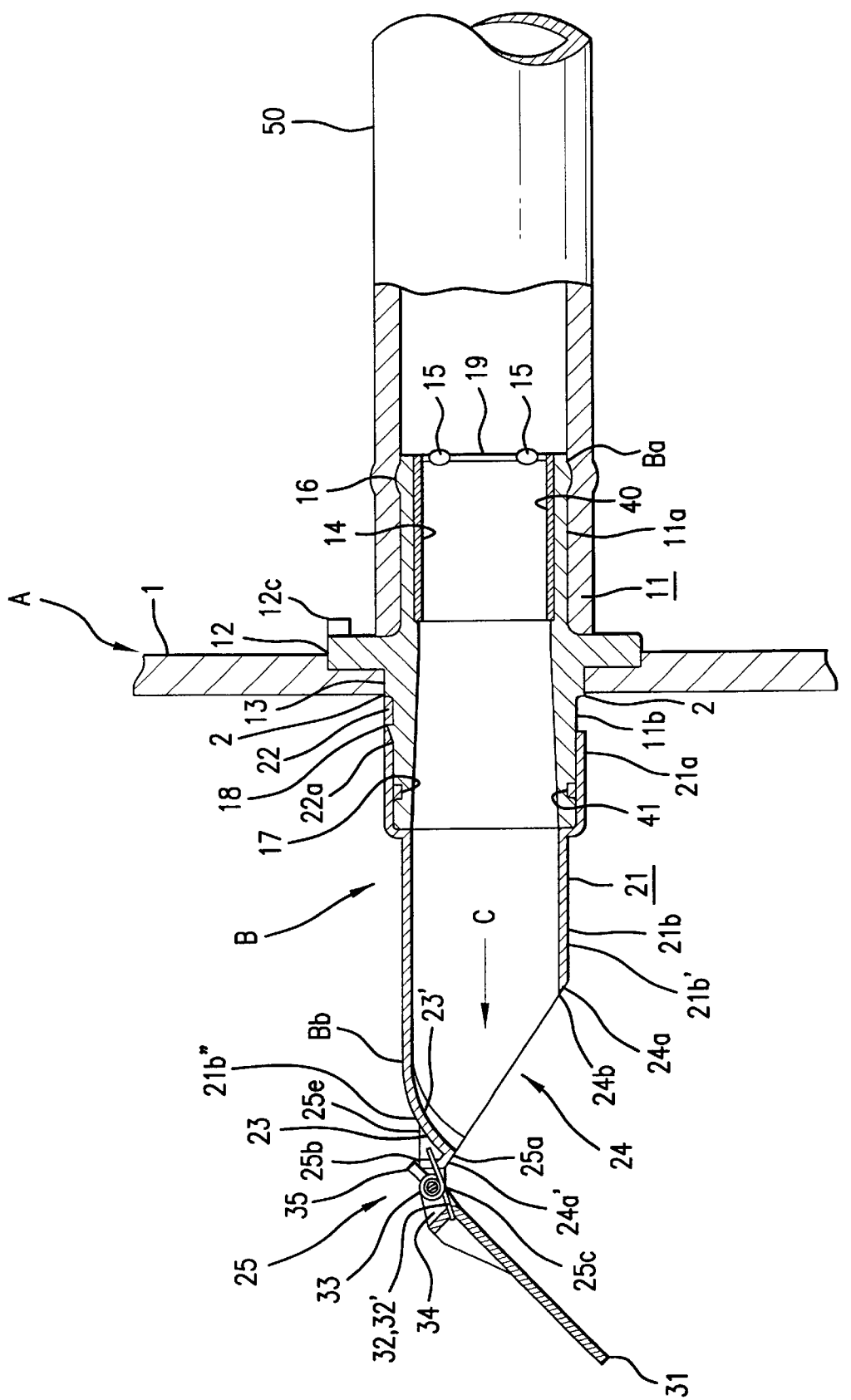
FIG. 2 is a sectional view showing the valve of FIG. 1 when the valve member is opened.

FIG. 1 is a partly sectional schematic view showing an attaching condition of the valve B according to the embodiment when a valve member 31 abuts against a valve seat 24b, and FIG. 2 is a partly sectional schematic view showing a condition that the valve member 31 is opened by a fluid pressure of a fluid C.

Figure 3:
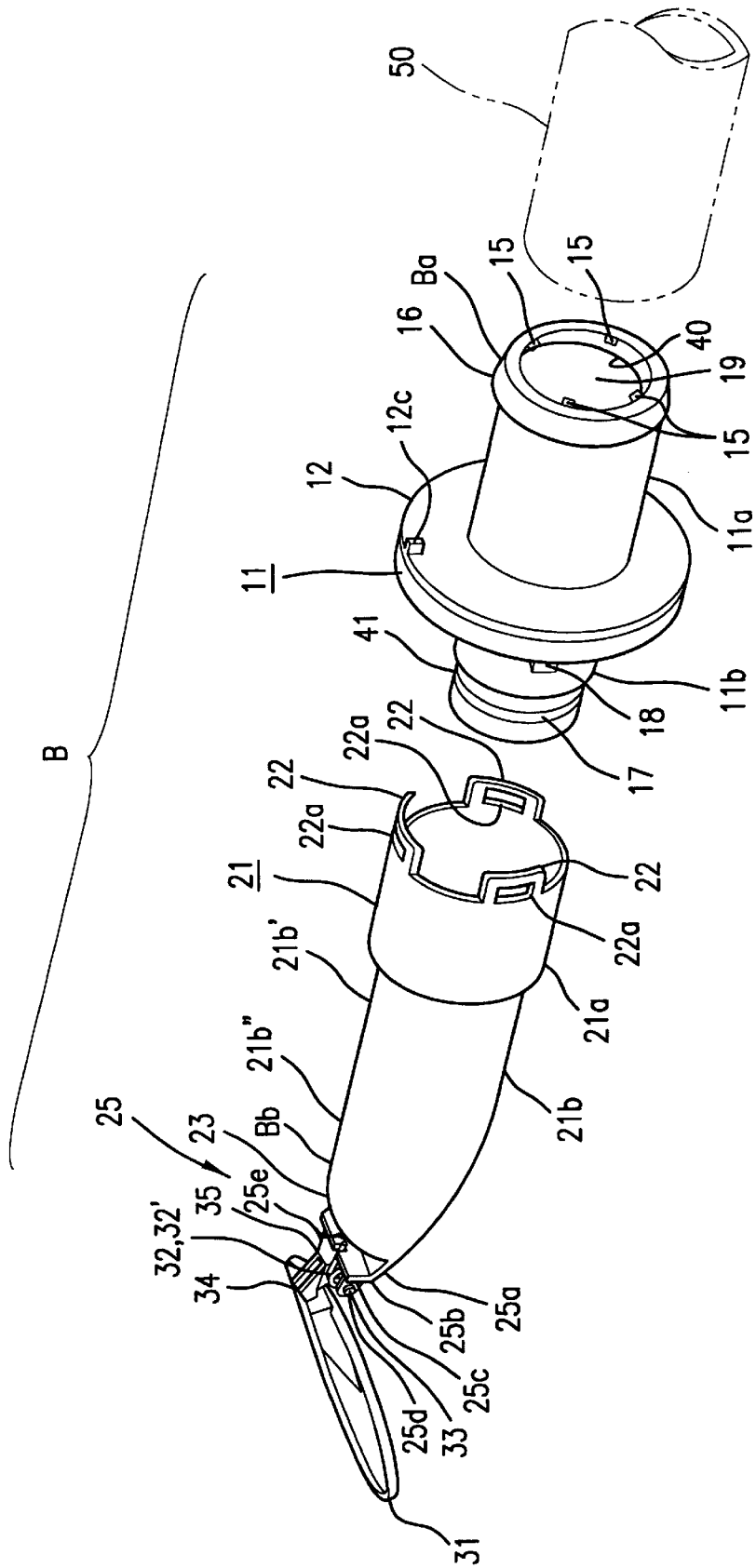
FIG. 3 is an exploded perspective view of main members of the valve shown in FIG. 1, showing that the main members are separated and seen from an upper side.
Figure 4:
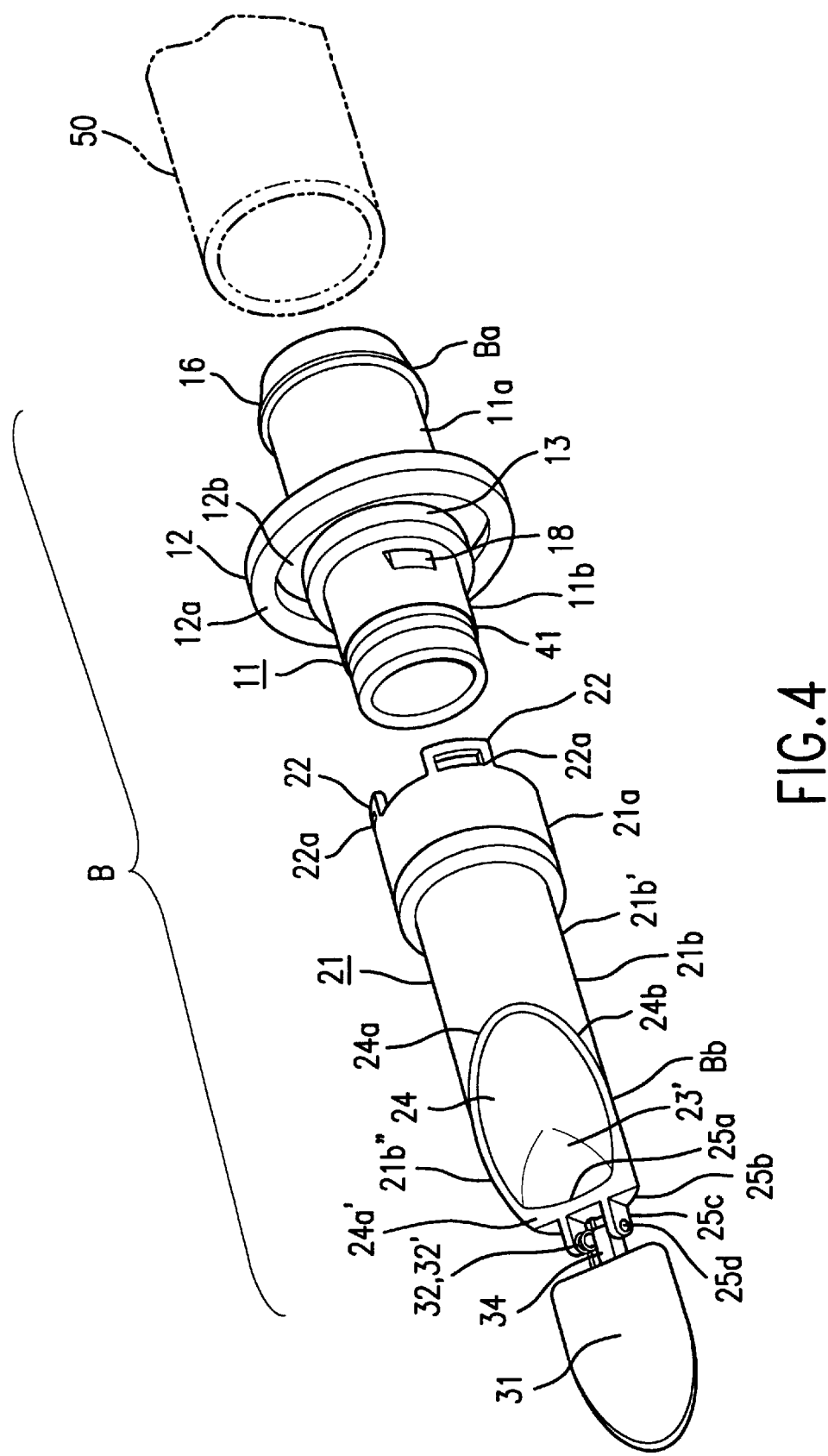
FIG. 4 is an exploded perspective view of the main members of the valve shown in FIG. 1, as seen from a lower side.

FIG. 3 is an exploded perspective view showing that main constituent members forming the valve B are separated and seen from an upper right, and FIG. 4 is an exploded perspective view showing the main members seen from a lower side.

Figure 5:
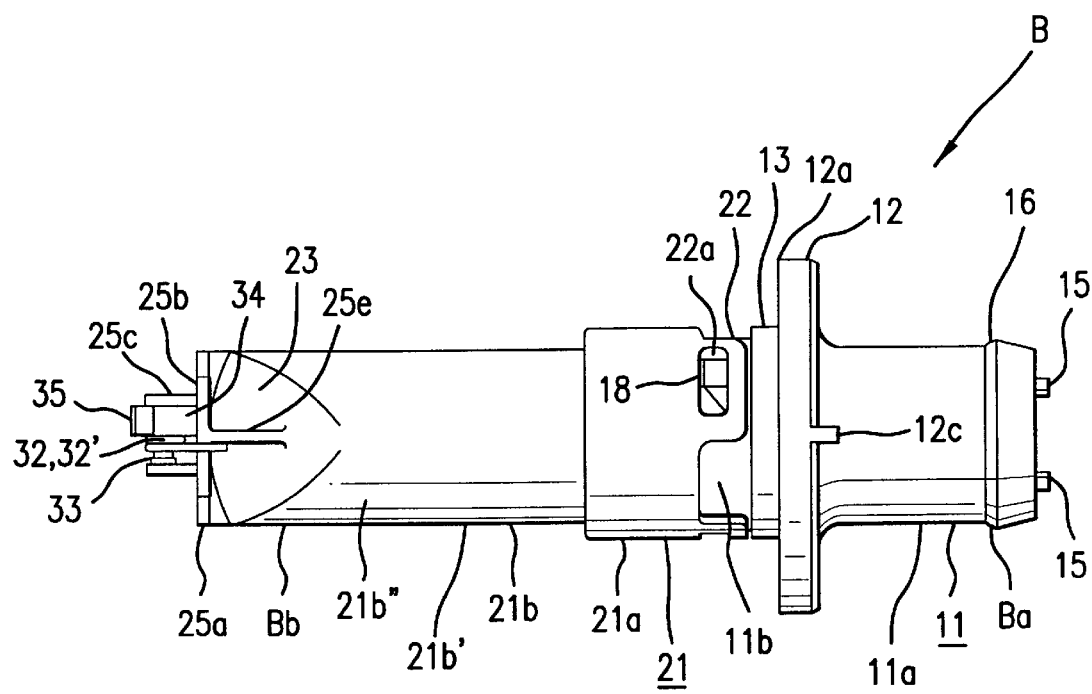
FIG. 5 is a top plan view showing a condition that the main members are assembled.
Figure 6:
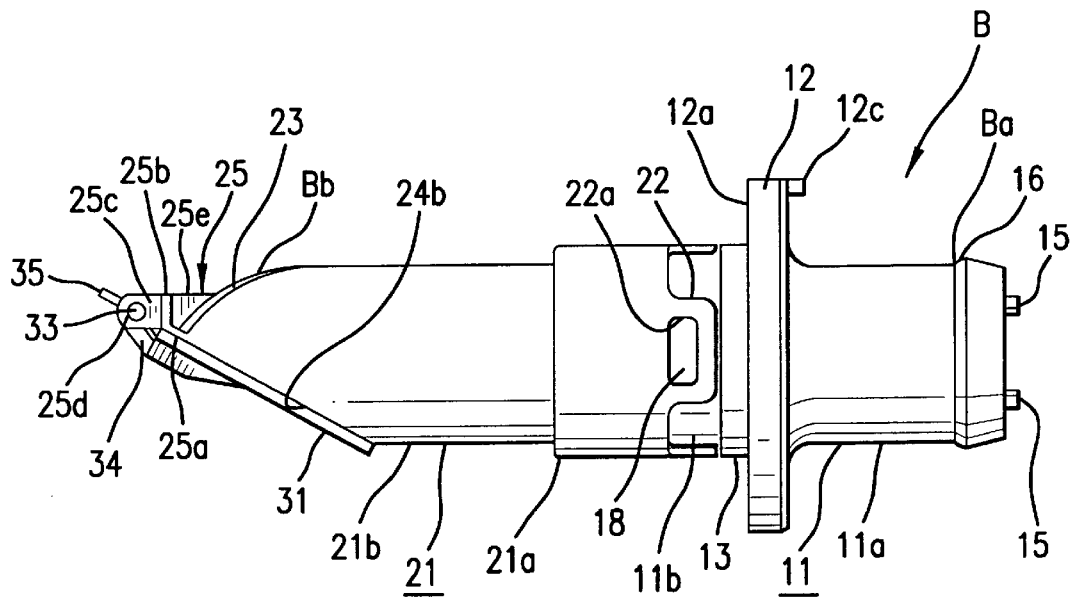
FIG. 6 is a front view of FIG. 5.
Figure 7:
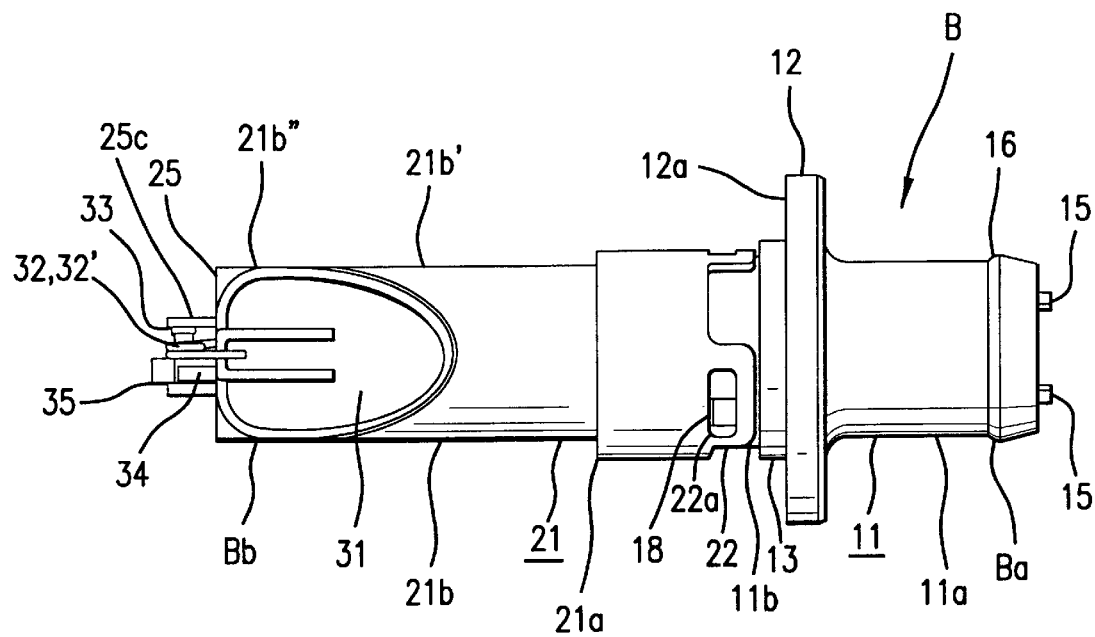
FIG. 7 is a bottom view of FIG. 5.
Figure 8:
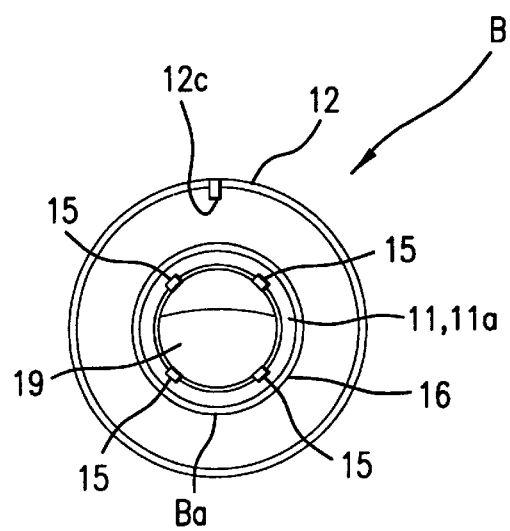
FIG. 8 is a right side view of FIG. 5.
Figure 9:
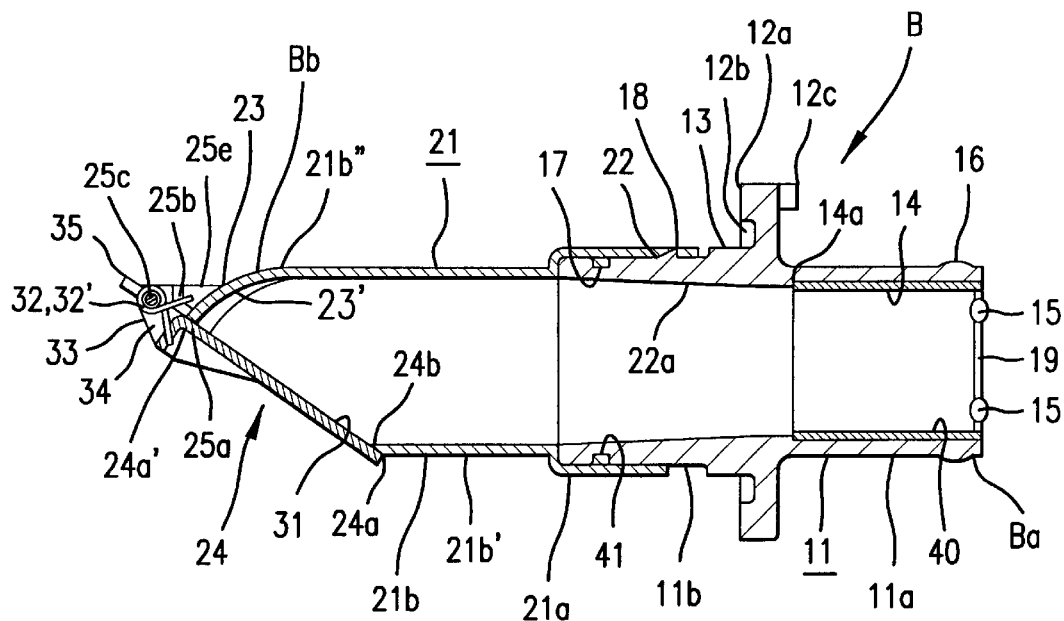
FIG. 9 is a sectional view of FIG. 6.
Figure 10:
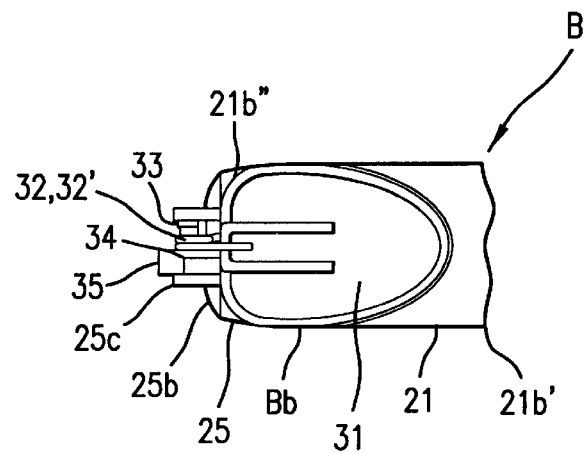
FIG. 10 is a bottom view of a main part of the valve shown in FIG. 5.
Figure 11:
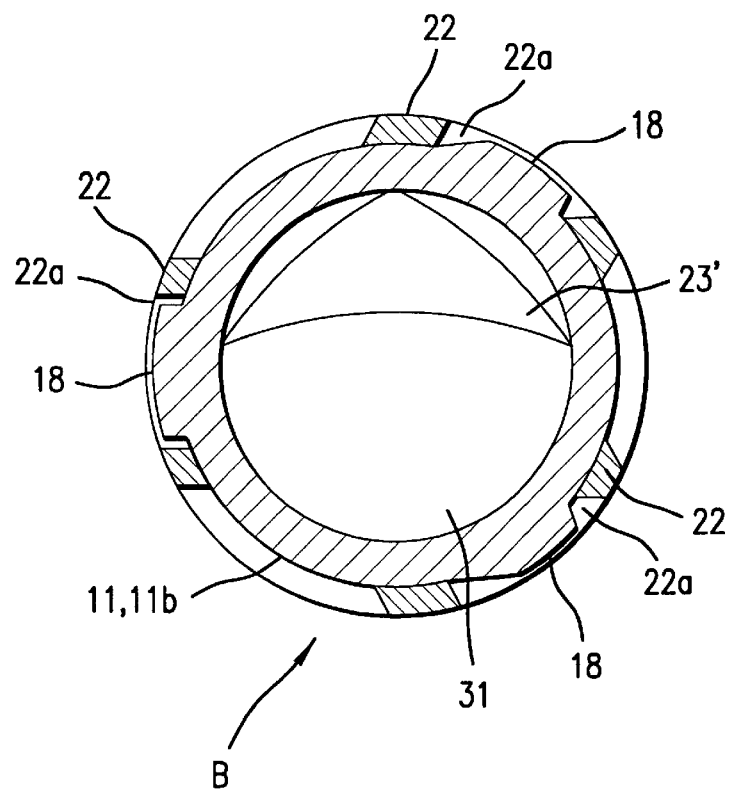
FIG. 11 is a sectional view of the main part of the valve shown in FIG. 5.

FIG. 5 shows the valve B in a condition that the constituent members are assembled, as seen from an upper side; FIG. 6 shows the valve B seen from a front side; FIG. 7 shows the valve B seen from a lower side; FIG. 8 shows the valve B seen from a right side; and FIG. 9 shows the valve B in a vertical section in an axial direction of the valve B. Also, FIG. 10 is a view of a main part of the valve B in a condition that the valve member 31 is closed at an outlet side opening portion of the valve, as seen from a lower side, and FIG. 11 shows a connection portion between a first cylindrical member 11 and a second cylindrical member 21 forming the valve B, as shown in a vertical section in a diameter direction of the valve B.

Figure 12:
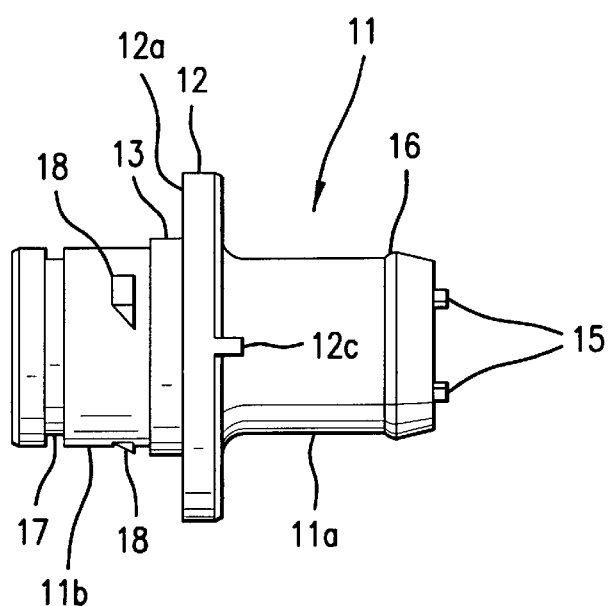
FIG. 12 is a front view of a first cylindrical member.
Figure 13:
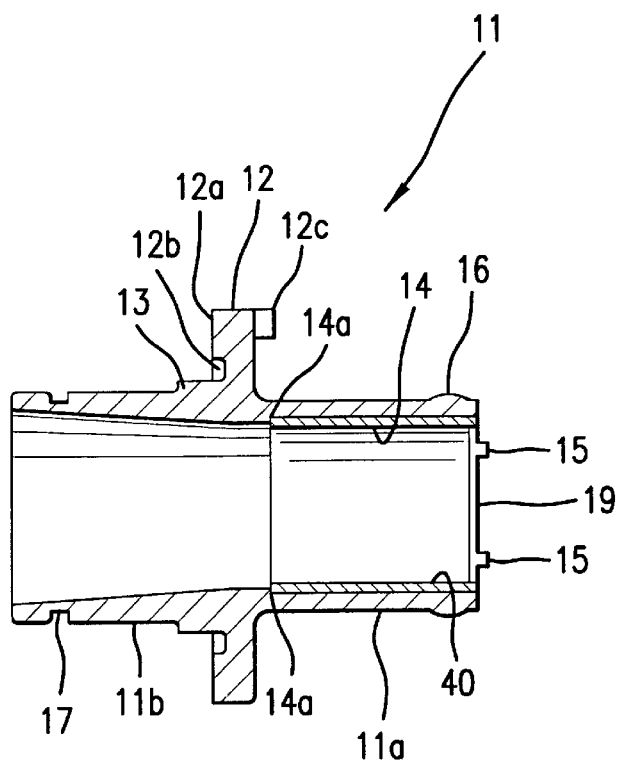
FIG. 13 is a sectional view of FIG. 12.
Figure 14:
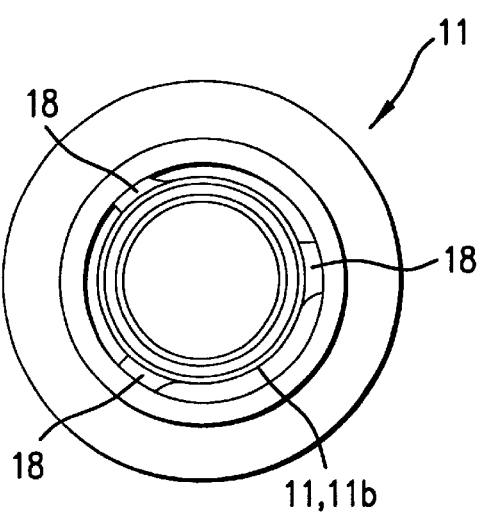
FIG. 14 is a left side view of FIG. 12.
Figure 15:
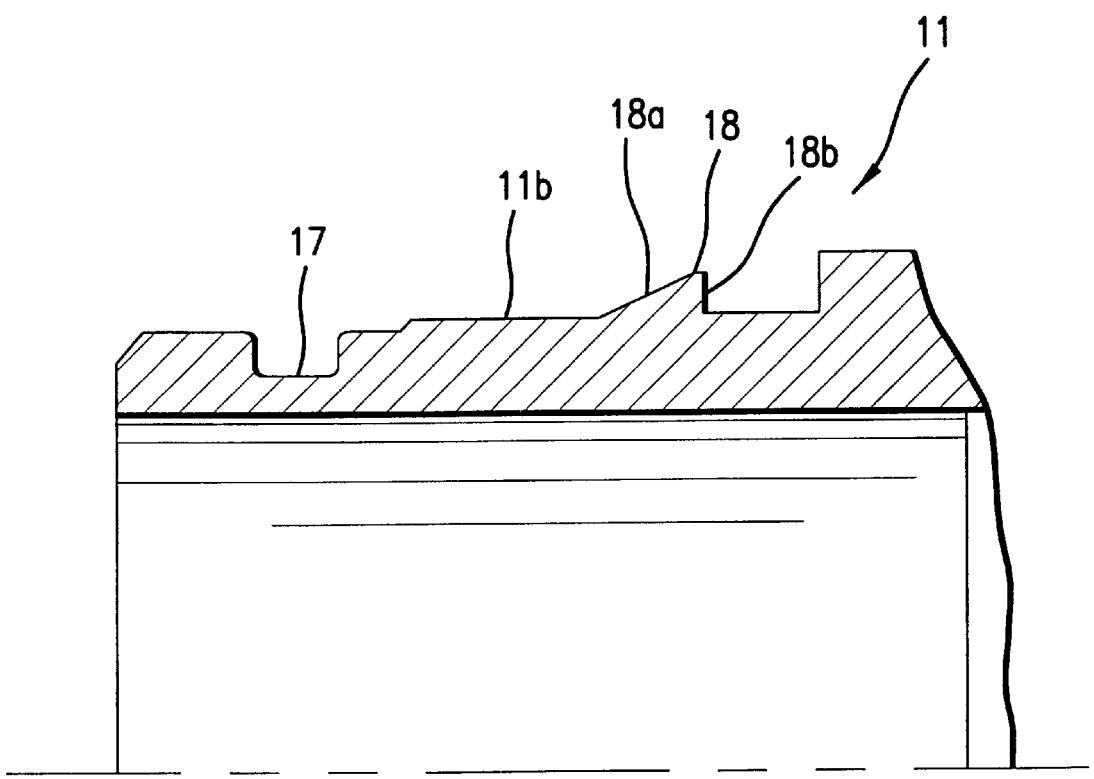
FIG. 15 is an enlarged sectional view of a main part of the first member.
Figure 16:
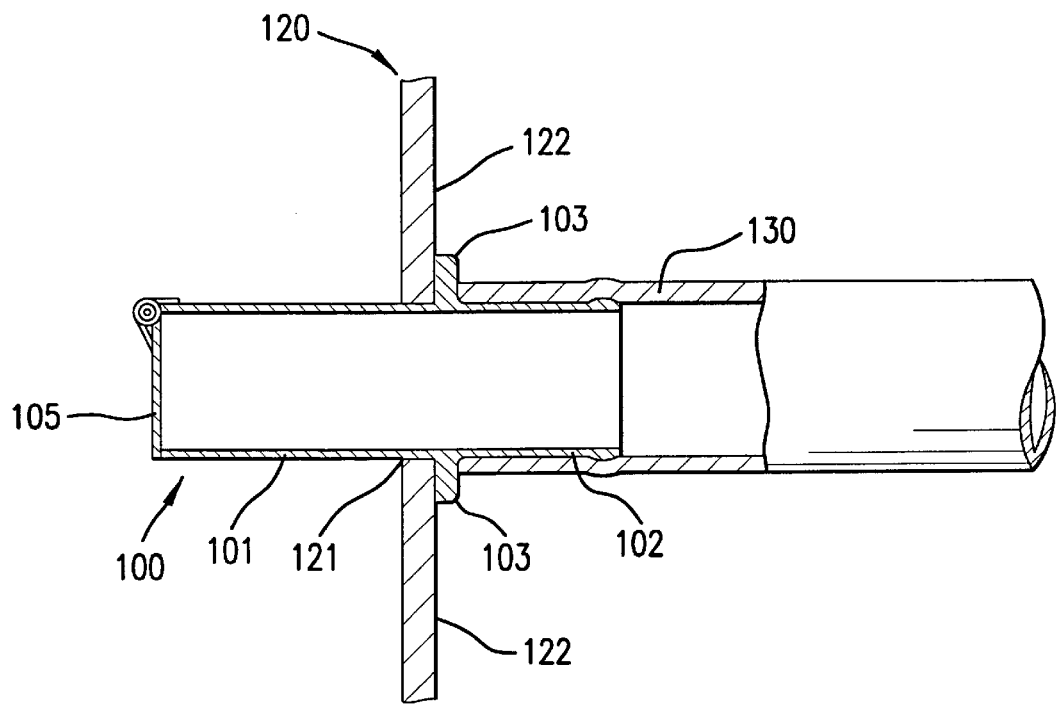
FIG. 16 is a partly sectional schematic view showing an example of a conventional valve.
Figure 17:
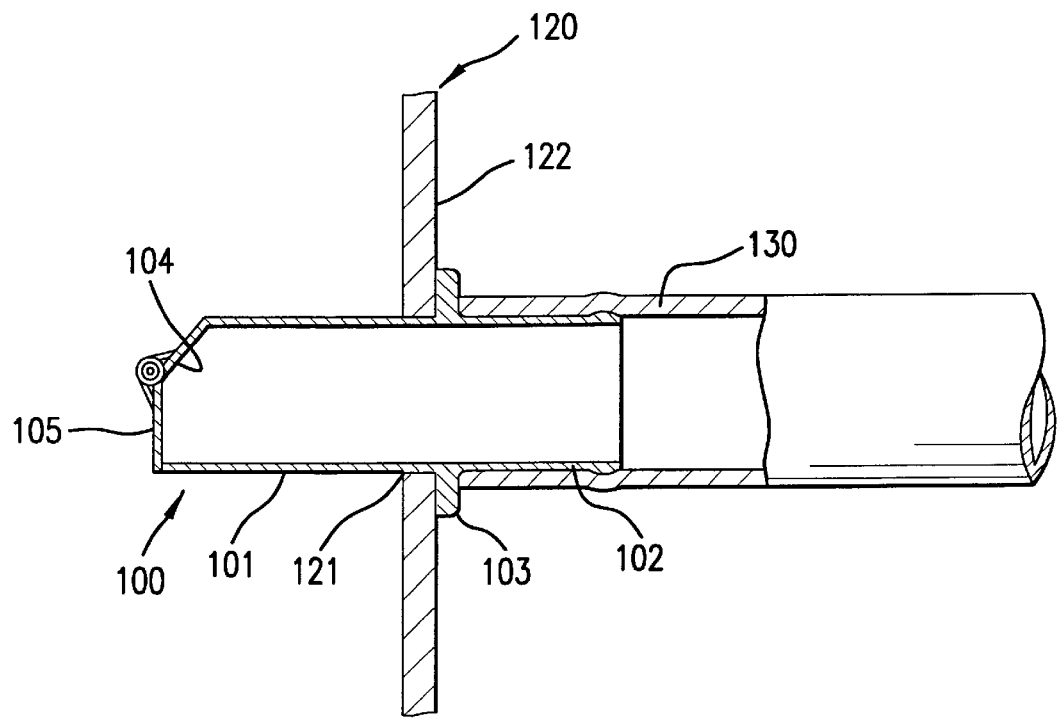
FIG. 17 is a partly sectional schematic view showing another example of the conventional valve.

Further, FIG. 12 shows the first cylindrical member 11 forming the valve B as seen from a front side; FIG. 13 shows the first cylindrical member 11 in a vertical section in an axial direction thereof; FIG. 14 shows the first cylindrical member 11 as seen from a left side; and FIG. 15 shows a main part of the first cylindrical member 11 in an enlarged section.

The valve B according to the embodiment of the invention has a cylindrical shape, wherein at least an outlet side open end surface 24a is formed as the valve seat 24b at an outlet side Bb, and a valve member 31 is formed to open by a movement of fluid C flowing from an inlet side Ba to the outlet side Bb, and to prevent a back flow from an outlet side opening 24 to the inlet side Ba.

The valve B arranged in a condition that the outlet side Bb orients forward is inserted from an outside of an attachment hole 2 of a tank A, so that an outer peripheral flange 12 provided in the valve B abuts against a surface of the tank A, and then the outer peripheral flange 12 is welded to the tank A.

A distal end portion of the outlet side Bb of the valve B is provided with a cylindrical wall portion 23' which changes a flow direction of the fluid C guided by the valve B, and the outlet side opening 24 is formed to cross obliquely relative to a flow direction of the fluid C guided by the cylindrical wall portion 23' such that an opening area of the outlet side opening 24 is larger than that of the inlet side opening 19.

In the valve B structured as described above, the valve B provided with the valve member 31 for preventing the back flow of the fluid C into the outlet side Bb is inserted from the outside of the attachment hole 2 into the tank A in a condition that the outlet side Bb of the valve B orients forward, and also, the valve B can be integrally welded to the tank A. Furthermore, it can be structured such that a flow direction of the fluid C guided by the valve B can be changed at the outlet side Bb of the valve B without decreasing a flow rate of supplying the fluid.

Further, in order to achieve the above object, according to a second aspect of the invention, the aforementioned valve B according to the first aspect of the invention includes the first cylindrical member 11 made of plastics and having the outer peripheral flange 12, wherein front and rear portions relative to the outer peripheral flange 12 constitute an attachment cylindrical portion 11a for a hose 50 and a connection cylindrical portion 11b; and the second cylindrical member 21 made of plastics and connected to the connection cylindrical portion 11b in the first cylindrical member 11. The valve member 31 is attached to a distal end thereof. The valve member 31 and the second cylindrical member 21 provided with the valve member 31 are formed of a plastic material which is more difficult to swell than that of the first cylindrical member 11.

In the valve B structured as described above, the valve B is capable of being inserted from the outside into the attachment hole 2 in the condition that the outlet side Bb of the valve B orients forward, and is attached and integrally welded to the tank A. The flow direction of the fluid C guided by the valve B is changed at the outlet side Bb of the valve B without reducing the supply amount of the fluid C in the valve B. Also, the valve member 31 provided at the outlet side Bb of the valve B can be disposed in the condition that opening and closing ability in the flow path is excellent.

More specifically, the valve B according to the embodiment of the invention supplies the fluid C in a low fluid resistance condition, and the plate-like valve member 31 for preventing a back flow is disposed at the outlet side Bb. The valve B is typically inserted into the tank A, such as fuel tank made of plastics and provided in an automobile, and is integrally welded with the tank A. Also, the valve B does not reduce a capability of supplying a fuel when the fuel, such as gasoline, is supplied, and furthermore, the valve B is structured by taking into account that at least the valve member 31 for preventing the back flow does not malfunction in accordance with swelling of the plastic material forming the valve member 31 and the second cylindrical member 21 to which the valve member 31 is provided.

The valve B according to the embodiment of the invention includes at least the first cylindrical member 11 made of plastics, the second cylindrical member 21 made of plastics, which are connected sealingly to each other, and the platelike valve member 31 for preventing the back flow made of plastics. Also, the first cylindrical member 11 is made of a material having swelling characteristics different from that of the second cylindrical member 21 and the valve member 31. More specifically, the second cylindrical member 21 and the valve member 31 are made of a plastic material, such as polyacetal, which does not swell easily as compared to the first cylindrical member 11, and the first cylindrical member 11 is formed of a plastic material, such as high density polyethylene, which is suitable for welding to the tank A.

First of all, the first cylindrical member 11 forming the valve B includes the outer peripheral flange 12 which is formed into an annular shape extending radially outwardly from an outer periphery of an approximately central portion of a cylindrical member having a circular section and a shape of a substantially linear cylinder. One side of the first cylindrical member 11, which extends from and defined by the outer peripheral flange 12 toward one side, constitutes the attachment cylindrical portion 11a which is inserted into and attached to the hose 50, such as filler hose, as the inlet side Ba in the valve B, and the other portion extending forward from an annular raised portion or stepped portion 13 continuing from the outer peripheral flange 12 constitutes the connection cylindrical portion 11b, which is inserted into the second cylindrical member 21 and attached thereto.

The first cylindrical member 11 used for forming the valve B includes the outer peripheral flange 12 in an annular shape having a larger outer diameter than a diameter of the opening of the circular attachment hole 2 formed in the surrounding wall plate portion 1 of the tank A. Also, the first cylindrical member 11 includes the attachment cylindrical portion 11a having a projecting width which allows to connect and attach the hose 50, such as filler hose, to the outside of the tank A in an engaged condition when the connection cylindrical portion 11b including the second cylindrical member 21 is inserted into the attachment hole 2 from the outside of the tank A toward the inside of the tank A in an approximately horizontal direction such that the outer peripheral flange 12 abuts against the surrounding wall plate portion 1 of the tank A. Further, the connection cylindrical portion 11b, which is projected from the annular raised portion 13 substantially positioned at the attachment hole 2 formed in the surrounding wall plate portion 1 to the inside of the tank A, includes a projecting width which allows the connection cylindrical portion to be fitted in and attached to the second cylindrical member 21 when the outer peripheral flange 12 is integrally welded to the surrounding wall plate portion 1 of the tank A in a condition that the outer peripheral flange 12 abuts against the surrounding wall plate portion 1 of the tank A.

The attachment cylindrical portion 11a in the first cylindrical member 11 is provided with a stepped cylinder portion 14 with a slightly enlarged diameter so as to tightly receive a metallic collar 40, such as steel pipe, thereinto throughout an approximately entire length thereof. Also, the metallic collar 40 having a length and a wall thickness, which is allowed to be substantially retained in an enlarged diameter step of the stepped cylinder portion 14, is fitted into the stepped cylinder portion in the condition that an outer peripheral surface of the collar 40 contacts a surface of the stepped cylinder portion 14. Also, a fitting piece 15, which is formed and prepared in a projecting condition along a cylinder rim at a cylindrical end of the attachment cylindrical portion 11a, is pushed against the cylinder end of the metallic collar 40 to be deformed in a thermal fitting condition to thereby fix the metallic collar 40 between the stepped surface 14a and the fitting piece 15. Thus, an inner surface of the metallic collar 40 and an inner cylinder surface of the connection cylindrical portion 11b form a flow passageway while they are connected to be on the substantially same plane.

Also, at an outer periphery of the distal end portion of the attachment cylindrical portion 11a which becomes the inlet side Ba in the valve B, an engaging raised portion 16 having a section in a form of a mountain is provided in its circumferential direction, and a raised height is decreased toward the cylinder end in the attachment cylindrical portion 11a, that is, a rim of an opening at the inlet side Ba in the first cylindrical member 11 forming the valve B, namely, it has a tapered structure.

The connection cylindrical portion 11b, which is provided on the other side with respect to the outer peripheral flange 12 and continues to the stepped raised portion 13, has an outer diameter slightly smaller than that of the stepped raised portion 13 in an annular band form continued to the outer peripheral flange 12 in the circumferential direction. The connection cylindrical portion 11b includes an annular groove 17, into which an O-ring 41 is fitted, in a circumferential direction at the distal end side. Further, a plurality of engaging projections 18, which engages engaging holes 22a of the second cylindrical member 21 fitted with the connection cylindrical portion 11b, is formed on the outer peripheral surface of the connection cylindrical portion 11b adjacent to the raised portion 13 in a condition that the engaging projections 18 are spaced away from each other to have predetermined intervals therebetween in a circumferential direction thereof.

The engaging projections 18 raised from the outer peripheral surface of the connection cylindrical portion 11b are structured such that elastic engaging frame members 22 forming the engaging holes 22a provided in the second cylindrical member 21 are pushed up by the engaging projections 18 when the connection cylindrical portion 11b is fitted into a connection cylindrical portion 21a of the second cylindrical member 21. Also, each engaging projection 18 is structured to have a shape and dimension to be favorably fitted in the engaging hole 22a when the engaging projection 18 is positioned in each engaging hole 22a provided in the second cylindrical member 21. More specifically, as shown in FIG. 15, the engaging projection 18 includes an inclined guide surface 18a which is gradually raised from the distal end side in the connection cylindrical portion 11b toward a side in which the outer peripheral flange 12 is provided; and an engaging surface 18b located on the side of the outer peripheral flange 12 and falling vertically downwardly from an apex of the inclined guide surface 18a to the outer peripheral surface of the connection cylindrical portion 11b.

The flow passageway in the first cylindrical member 11 forming the valve B is structured such that an inner diameter of the connection cylindrical portion 11b becomes gradually larger toward the cylinder end side so as to gradually reduce a resistance toward a flow passageway formed by the second cylindrical member 21 connected to the flow passageway in the first cylindrical member 11.

The outer peripheral flange 12 provided between the attachment cylindrical portion 11a and the connection cylindrical portion 11b includes a welding margin 12a on the abutting side, which is tightly attached and welded to the surrounding wall plate portion 1 of the tank A and covers the attachment hole 2 completely when the side of the second cylindrical member 21 in the valve 5 provided with the outer peripheral flange 12 is inserted into the attachment hole 2 formed in the tank A made of plastics. Namely, the welding margin 12a is formed annularly on the outer peripheral portion on the side of the raised portion 13. The outer peripheral flange 12 also includes an annular groove 12b in a peripheral direction at a base portion of the outer peripheral flange 12.

Incidentally, a projection 12c is provided on a side opposite to the abutting side of the outer peripheral flange 12 with respect to the surrounding wall plate portion 1, and it is structured that the valve B can be welded to the tank A by utilizing the projection 12c as a guide.

The annular raised portion 13 continued to the outer peripheral flange 12 and provided on a side of the connection cylindrical portion 11b has a predetermined width to be in a band shape and is raised from the connection cylindrical portion 11b to have a predetermined step therebetween, and the annular raised portion 13 is structured such that the inner peripheral surface of the attachment hole 2 of the tank A faces the side of the annular raised portion 13 when the outer peripheral flange 12 is welded to the surrounding wall plate portion 1 of the tank A. The valve B can be attached to the tank A in a condition that a posture of the valve B is maintained.

The second cylindrical member 21 forming the valve B together with the first cylindrical member 11 is made of a plastic material, which does not swell easily with respect to the material of the first cylindrical member 11. For example, in case the first cylindrical member 11 is formed of high density polyethylene as a material suitable for welding to the tank A made of the plastic, the second cylindrical member 21 assembled with the first cylindrical member 11 is formed of a material which does not swell easily, such as polyacetal. At least, the valve member 31 provided in the second cylindrical member 21 is formed of the same material, for example, polyacetal, as the second cylindrical member 21, so that the valve member 31 for preventing the back flow surely and tightly contacts the valve seat 24b to form the valve closing condition, and provides a valve open condition when the fluid C flows in.

The second cylindrical member 21 attached to the first cylindrical member 11 in an external fitting condition is formed of a cylindrical member having circular sections with different diameters. The second cylindrical member 21 includes a connection cylindrical portion 21a in a linear cylindrical form which tightly fits and engages the connection cylindrical portion 11b in the first cylindrical member 11, and an outlet side cylindrical portion 21b which has an inner diameter approximately the same as the inner diameter of the connection cylindrical portion 11b fixed to the connection cylindrical portion 21a. The second cylindrical member 21 is provided with the valve member 31 for preventing the back flow of the fluid C to the outlet side Bb when the second cylindrical member 21 is assembled with the first cylindrical member 11.

The outlet side cylindrical portion 21b connected to the connection cylindrical portion 21a has a structure such that an upper portion of a linear cylindrical portion 21b', which continues to the connection cylindrical portion 21a and has a slightly smaller diameter than that of the connection cylindrical portion 21a, projects more than a lower portion of the linear cylindrical portion 21b'. Also, a distal end portion of the cylinder upper portion 21b' projecting more than the lower portion of the linear cylindrical portion 21b' is bent downwardly to constitute a bent portion 23, and the bent portion 23 forms a cylindrical wall portion 23' which changes the flow direction of the fluid C guided into the second cylindrical member 21 downwardly.

Also, there is disposed the outlet side opening 24 facing downwardly and including a line segment connecting a distal end of the bent portion 23 and a lower end of the linear cylindrical portion 21b', more specifically, an oblique line segment connecting between the distal end of the bent portion 23 and a distal end portion of the lower end of the linear cylindrical portion 21b' defined corresponding to the distal end of the bent portion 23. The outlet side opening 24 has an opening area larger than the opening area of the inlet side opening 19 which is calculated from a diameter of the metallic collar 40 in the attachment cylindrical portion 11a of the first cylindrical member 11.

More specifically, the outlet side opening 24 provided in the outlet side cylindrical portion 21b of the second cylindrical member 21 is structured as an opening which faces downwardly and obliquely crosses the direction of the flow of the fluid C guided by the cylindrical wall portion 23' formed of the bent portion 23 projected forwardly from the linear cylindrical portion 21b'.

Especially, it is structured such that a width of the outlet side opening 24 provided in the valve B according to the embodiment gradually increases from a lower end side of the linear cylindrical portion 21b' toward a side of the bent portion 23 as the upper distal end side of the second cylindrical member 21 as shown in FIG. 4. More specifically, the outlet side opening 24 includes a plane crossing an imaginary horizontal plane, which includes a center line of the linear cylindrical portion 21b' shown in FIG. 1 and FIG. 2, with equal angles. Furthermore specifically, the outlet side opening 24 is arranged in a direction obliquely crossing the center line of the linear cylindrical portion 21b' so as to project forwardly at the upper portion of the linear cylindrical portion 21b', and the upper portion of the distal end portion of the linear cylindrical portion 21b' constitutes the bent portion which forms the cylindrical wall portion 23' downwardly changing the direction of the flow of the fluid C guided by the linear cylindrical portion 21b'.

Also, in the connection cylindrical portion 21a in the second cylindrical member 21, the elastic engaging frame members 22 are projected as extension portions of the cylinder portion in the connection cylindrical portion 21a from a cylinder end opposite to the side having the outlet side cylindrical portion 21b, that is, so as to have an imaginary circle, which has an inner diameter same as an inner cylinder diameter of the connection cylindrical portion 21a, as an inner surface.

The elastic engaging frame members 22 projecting from the cylinder end of the connection cylindrical portion 21a are provided in the same number of members as that of the engaging projections 18, and spaced away from each other with the predetermined intervals in the circumferential direction of the cylinder end corresponding to the respective engaging projections 18 provided in the first cylindrical member 11. The inner surface of each elastic engaging frame member 22 constitutes an extension surface of the inner surface of the connection cylindrical portion 21a.

Each elastic engaging frame member 22 provided in the connection cylindrical portion 21a projects from the cylinder end of the connection cylindrical portion 21a as a projecting piece in a substantially rectangular form elongated in the circumferential direction, and the engaging hole 22a elongated in the circumferential direction is formed to pass through in the thickness direction of the elastic engaging frame member 22. Each elastic engaging frame member 22 is formed to elastically bent outwardly with respect to the connection cylindrical portion 21a, and is elastically returned.

In the distal end side of the second cylindrical member 21, that is, in the distal end side of the bent portion 23, there is provided means for preventing a back flow of the fluid C, that is, the means opening by an inflow of the fluid C from the inlet side Ba in the valve B, and closing by a back pressure so as to prevent the back flow from the side of the tank A toward the inlet side Ba of the valve B.

The back flow preventing means provided in the second cylindrical member 21 includes the valve seat 24b formed of the end surface 24a of the outlet side opening 24 provided to be on the same plane, more specifically, the valve seat 24b which is formed of the end surface 24a and a part of an extension surface 24a' of the end surface 24a; the valve member 31 in the plate form seated on the valve seat 24b to close the valve seat 24b for preventing the back flow; and urging means 32, more specifically, a helical torsion spring 32', which generally pushes the valve member 31 against the outlet side opening 24 to urge the valve member 31 in the valve closing condition. At the distal end of the bent portion 23, a shaft 33 integrally provided with the valve member 31 is freely rotatably attached to a shaft attachment portion 25 integrally provided with the second cylindrical member 21. Also, one end of the helical torsion spring wound around the shaft 33 is pushed against the bent portion 23 of the second cylindrical member 21, and the other end of the spring is pushed against the valve member 31, so that the valve member 31 is closely or tightly contacted to the valve seat 24b to generally urge the valve member 31 to a closing direction.

The shaft 33 of the valve member 31 for preventing the back flow is integrally provided to a handle portion 34 extending from the valve member 31, in a direction perpendicularly to an axial direction of the handle portion 34 orienting in the direction of the flow of the fluid C. Also, a stopper 35, which is formed integrally with the handle portion 34, is disposed to extend from the shaft 33 toward a side opposite to the handle portion 34, so that a maximum opening position of the valve member 31 can be defined. The valve member 31 provided with the shaft 33, the handle portion 34 and the stopper 35 is formed integrally by a plastic molding, and made of a plastic material which does not swell easily relative to the first cylindrical member 11.

The shaft attachment portion 25 of the second cylindrical member 21, to which the valve member 31 forming the back flow preventing means is attached, is formed integrally with the second cylindrical member 21 by a plastic molding, using the same material as that of the second cylindrical member 21. The distal end side of the bent portion 23 is integrally provided with a projecting plate portion 25a including the extension surface 24a' of the end surface 24a of the outlet side opening 24, and a distal end of the projecting plate portion 25a is placed vertically and substantially upwardly to constitute a standing plate portion 25b. A pair of shaft receiving pieces 25c is provided at the standing plate portion 25b. The shaft 33 of the valve member 31 is freely rotatably supported in shaft attachment holes 25d formed in the shaft receiving pieces 25c.

Incidentally, in the embodiment shown in the figures, as more clearly understood from FIG. 4, it is structured that an opening lateral width of the outlet side opening 24 becomes the largest at the side of the bent portion 23, and the end surface 24a extends upwardly from the position where the lateral width becomes the largest. Also, the projecting plate portion 25a is structured to include the extension surface 24a' of the end surface 24a. Therefore, the valve member 31 has a shape in which a base end side thereof has a wide width, and the distal end side thereof is gradually tapered and has a narrower width so that the extension surface 24a' of the end surface 24a and the portion of the extension surface 24a' constitute a surface of the valve seat 24b.

Also, in the embodiment shown in the figures, the standing plate portion 25b, which stands in a bending manner upwardly from the projecting plate portion 25a including the extension surface 24a' of the end surface 24a of the outlet side opening 24, is provided to be elongated in a lateral direction of the bent portion 23, that is, in a direction perpendicular to the direction of the flow of the fluid C. Also, with respect to the standing plate to portion 25b elongated in the lateral direction, a pair of the shaft receiving pieces 25c spaced apart with a predetermined interval therebetween and having plate surfaces orienting in a longitudinal direction, that is, in the direction of the flow of the fluid C, is provided at the same height position so that the plate surfaces thereof face each other. The shaft attaching holes 25d respectively provided at the shaft receiving pieces 25c are positioned on the same horizontal line.

Also, a stiffening rib 25e for preventing a bending of the standing plate portion 25b is provided between the standing plate portion 25b and an outer surface of the bent portion 23.

The shaft 33 of the valve member 31 is fitted into the shaft attachment holes 25d in the shaft attachment portion 25, and by the urging means 32, the valve member 31 covers the valve seat 24b formed of the end surface 24a in the outlet side opening 24 and a part of the extension surface 24a' to constitute the same plane, so as to always maintain the condition of completely closing the end surface 24a, thereby achieving the back flow preventing means. Namely, in the helical torsion spring 32' as the urging means 32 wound around the shaft 33 in the urging force storing condition, one end of the helical torsion spring 32' is pushed against the valve member 31 in the condition of closing the outlet side opening 24, and the other end of the helical torsion spring 32' is pushed against the standing plate portion 25b of the attachment portion 25, so that the valve member 31 is urged in the direction of pushing the surface of the valve seat 24b of the outlet side opening 24.

According to the urging force by the urging means 32 with respect to the valve member 31 forming the back flow preventing means structure as described above, when the fluid C, such as fuel, is supplied by the hose 50, such as filler hose, from the side of the first cylindrical member 11 in the valve B, the valve member 31 is rotated against the urging force by the urging means 32 to thereby open the outlet side opening 24. Also, the urging force is provided such that when supply of the fluid C, such as fuel, is stopped, the valve member 31 closely or tightly contacts the surface of the valve seat 24b by the urging force of the urging means 32 to thereby prevent the back flow of the fluid. Especially, the urging means 32 is provided with the urging force which can achieve the aforementioned function even if the valve member 31 is located in a fuel, such as gasoline, in the tank A.

Also, in the embodiment shown in the figures, the back flow preventing means provided in the valve B has a structure such that the valve member 31 which opens in accordance with the supply of the fluid C, such as fuel, starts to open forward from the outlet side opening 24 so as to produce a fluid resistance as little as possible while the fluid C is supplied through the valve B. Furthermore, in the condition that the resistance at the outlet side opening 24 is reduced, in order to change the flow direction of the fluid C, such as gasoline, guided from the outlet side opening 24 to the tank A as much as possible, the valve member 31 can maintain a surface orienting obliquely downwardly toward the front side at the front of the outlet side opening 24. Namely, it is structured that the stopper 35 abuts against the standing plate portion 25b so that the outlet side opening end surface 24a and the valve member 31 can maintain the position of forming an acute angle while the fluid C is supplied.

The O-ring 41, which is formed of a rubber-like elastic material, for example, acrylonitrile-butadiene rubber, is fitted into the annular groove 17 of the first cylindrical member 11 structured as described above, and the connection cylindrical portion 11b in the first cylindrical member 11, which is provided integrally with the metallic collar 40 in the fitted condition by the fitting piece 15, is closely pushed into the connection cylindrical portion 21a of the second cylindrical member 21 to fit the respective members in the watertight condition. Also, the engaging projections 18 in the first cylindrical member 11 are guided into the engaging hole 22a by utilizing the bending of the elastic engaging frame members 22, and the elastic engaging frame members 22 are engaged with the engaging holes 22a by utilizing the elastic return of the elastic engaging frame members 22, to assemble both the members integrally for forming the valve B.

The valve B structured in a substantially linear cylinder form is oriented to face from the outside of the tank A to the inside thereof with respect to the attachment hole 2 provided in the tank A made of plastics, for example, the tank A including the surrounding wall plate portion 1 made of high density polyethylene, and the side of the valve member 31 of the valve B is positioned forward in the substantially horizontal direction. Furthermore, an attachment side of the shaft 33 of the valve member 31 faces upward, that is, the outlet side opening 24 is opened downwardly. In this condition, the valve B is inserted into the attachment hole 2 such that a surface facing the side of the surrounding wall plate portion 1 in the outer peripheral flange 12 of the first cylindrical member 11 forming the valve B is allowed to abut against the surface of the surrounding wall plate portion 1 located in the surrounding side portion of the attachment hole 2. In this condition, the projection 12c is used as a guide, and the outer peripheral flange 12 is integrally welded to the surrounding wall plate portion 1 by using a welding machine.

The valve B structured as described above is provided at, for example, the tank A in the automobile, and the hose 50 for the fluid C, for example, the filler hose made of a soft plastic material or a rubber-like elastic material provided such that one side of the hose communicates with a fuel port, is fitted to the attachment cylindrical portion 11a in the valve B. More specifically, the attachment cylindrical portion 11a is pushed into the hose 50 to be fitted therewith. Then, a metallic band, not shown, is wound around the hose 50 fitted with the attachment cylindrical portion lha to be tighten, to thereby fixedly attach the hose 50 to the attachment cylindrical portion 11a.

In the valve B structured as described above, in the condition that the fluid C, such as fuel, is not supplied from the hose 50, the valve member 31 is seated and contacts the valve seat 24b by the urging force of the urging means 32, so as to maintain the condition of closing the outlet side opening 24.

Therefore, there is no inconvenience such that the fuel in the tank A flows backwardly to the side of the fuel port by, for example, rocking or swinging of the automobile, or overturning of the automobile.

Also, in case the fluid C is supplied to the valve B during fueling or the like, the valve member 31 starts to open by the supplied fluid C, so that the fluid C, such as fuel, can be supplied to the tank A.

Further, even when an inner pressure in the tank A is high in case of supplying the fluid C, such as fuel, the valve member 31 as the back flow preventing means abuts against the valve seat 24b closely or tightly. Thus, there is no inconvenience such that the fuel or the like flows backwardly from the side of the tank A.

Especially, in the valve B according to the embodiment, the distal end portion of the outlet side Bb forming the valve B is provided with the cylindrical wall portion 23' which changes the direction of the flow of the fluid C guided by the valve B, and the opening area of the outlet side opening 24 is larger than that of the inlet side opening 19. Therefore, it is possible to minimize the fluid resistance caused in accordance with changing of the flow direction of the fluid C guided by the valve B to introduce the fluid C into the tank A, and an ability of supplying the fluid, such as ability of fueling, is not prevented in accordance with the change of the flow direction of the fluid C.

Also, in the valve B according to the embodiment, the first cylindrical member 11 forming the valve B is made of a plastic material which is suitable for welding to the tank A to which the valve B is provided, and the second cylindrical member 21 provided with the valve member 31 for constituting back flow preventing means is formed of a plastic material which does not swell easily as compared to that of the first cylindrical member 11, to thereby facilitate attachment and fixing the valve B to the tank A. Also, the valve B is structured such that a valve closing function of the back flow preventing means in accordance with the swelling of the plastic material is not deteriorated. Also, there is prevented an inconvenience caused by swelling of the plastic material as a result of forming the outlet side opening 24 large and elongated, and forming the valve member 31 which closes the outlet side opening 24 to be large or long in an elongated direction.

The valve according to the present invention has a cylindrical form and is provided with at least the valve member disposed at the outlet side, wherein the valve member opens by a movement or flow of the fluid from the inlet side to the outlet side and prevents a back flow, and the outlet side end surface constitutes the valve seat. The valve is inserted from the outside of the attachment hole of the tank, to which the valve is attached, such that the outlet side of the valve is located forward and the outer peripheral flange provided in the valve abuts against the surface of the tank, and then, the outer peripheral flange is welded to the tank. Also, the distal end portion of the outlet side of the valve is provided with the cylindrical wall portion which changes the flow direction of the fluid guided by the valve, and the outlet side opening is formed in the direction of obliquely crossing the flow direction of the fluid guided by the cylinder wall portion in the valve such that the outlet side opening has a larger opening area than that of the inlet side opening.

Therefore, the valve provided with the valve member for preventing the back flow of the fluid at the outlet side is inserted into the tank such that the outlet side of the valve is located forward and inserted from the outside of the attachment hole, and the valve can be integrally welded to the tank. Also, there is an advantage such that the flow direction of the fluid guided by the valve at the outlet side of the valve can be changed without decreasing the supply amount of the fluid.

Furthermore, in the valve structure as described above, the valve is formed of the first cylindrical member made of plastics in a cylindrical form including the outer peripheral flange, wherein the front and rear portions defined by the outer peripheral flange constitute the attachment cylindrical portion for the hose and the connection cylindrical portion; and the second cylindrical portion which is connected to the connection cylindrical portion in the first cylindrical portion and includes the valve member at the distal end portion thereof. At least, the valve member and the second cylindrical portion including the valve member are formed of a plastic material which does not swell easily as compared to the first cylindrical portion. The valve is inserted from the outside into the attachment hole while the outlet side of the valve is located forward, and the valve can be integrally welded to the tank. Also, there is an advantage that the valve can change the flow direction of the fluid guided by the valve at the outlet side of the valve without decreasing the supply amount of the fluid in the valve, and the valve member provided at the outlet side of the valve can be made in the condition that opening and closing abilities in the flow passageway are excellent.

While the invention has been explained with reference to the specific embodiments of the invention, the explanation is illustrative and the invention is limited only by the appended claims.

What is claimed is:

1. A back flow preventing valve comprising:

a valve main body including a fluid inlet at one side, a fluid outlet at the other side having a valve seat at an end surface thereof, an area of the fluid outlet being greater than that of the fluid inlet, a flange extending outwardly from an outer periphery thereof and located between the fluid inlet and outlet, and a bent portion situated inside the valve main body near the fluid outlet for changing a flowing direction of a fluid flowing through the valve main body, said valve main body being formed of a first cylindrical member having an attachment portion with the fluid inlet and a connection portion extending from the attachment portion, said flange being located between the attachment portion and the connection portion, and a second cylindrical member connected to the connection portion and having the fluid outlet, and a valve member pivotally connected to the valve main body and urged toward the valve seat, said valve member being opened when a fluid entering from the fluid inlet is ejected from the fluid outlet, and closed when the fluid does not flow from the fluid inlet to the fluid outlet, said valve member and the second cylindrical member being made of a plastic material which does not swell easily in the fluid as compared to a plastic material for the first cylindrical member.

2. A back flow preventing valve according to claim 1, wherein said valve seat formed at the fluid outlet orients obliquely relative to a longitudinal direction of the valve main body.

3. A back flow preventing valve according to claim 2, wherein said valve main body has an outer size such that the valve main body is entered from a side of the fluid outlet into a hole of a valve attaching portion to allow the flange to be fixed to the valve attaching portion.

4. A back flow preventing valve according to claim 1, wherein said valve main body has a flow path between the fluid inlet and outlet, said flow path having an inner size perpendicular to a longitudinal direction of the valve main body, said inner size gradually increasing from the fluid inlet to the fluid outlet.

5. A back flow preventing valve according to claim 1, wherein said first cylindrical member has a plurality of first engaging portions on an outer periphery of the connection portion, and said second cylindrical member has a plurality of second engaging portions engaging the first engaging portions so that when the second cylindrical member is disposed over the connection portion, the first and second engaging portions engage together.

6. A back flow preventing valve according to claim 5, wherein said valve main body further includes a metal collar situated inside the attachment portion.

7. A back flow preventing valve according to claim 1, wherein said valve member has a pivotal shaft connected to an upper portion of the second cylindrical member, and a stopper near the pivotal shaft to limit a maximum open position of the valve member relative to the valve seat.

* * * * *